(12) United States Patent
Kneisl

(10) Patent No.: US 6,892,983 B2
(45) Date of Patent: May 17, 2005

(54) ANTI-HIJACKING SYSTEM

(76) Inventor: Philip Kneisl, 3714 Crescent Dr., Pearland, TX (US) 77584

(*) Notice: Subject to any disclaimer, the term of this patent is extended or adjusted under 35 U.S.C. 154(b) by 0 days.

(21) Appl. No.: 10/753,550

(22) Filed: Jan. 8, 2004

(65) Prior Publication Data
US 2004/0188566 A1 Sep. 30, 2004

Related U.S. Application Data

(63) Continuation of application No. 10/209,435, filed on Jul. 30, 2002, now Pat. No. 6,688,555.

(51) Int. Cl.⁷ .............................................. B64D 25/00
(52) U.S. Cl. .................................... 244/118.5; 102/502
(58) Field of Search ..................... 244/118.5, 118.6, 244/119, 121

(56) References Cited

U.S. PATENT DOCUMENTS 5,792,976 A * 8/1998 Genovese ................... 102/293
6,412,391 B1 * 7/2002 Stevens et al. ............ 89/36.17
6,470,784 B1 * 10/2002 Bonavita et al. .......... 89/36.17

* cited by examiner

Primary Examiner—Teri Pham Luu
Assistant Examiner—Stephen A. Holzen

(57) ABSTRACT

The present invention provides an anti-hijacking system. In one embodiment, the anti-hijacking system is used in an airplane to provide forceful contact to disarm, disable, immobilize or otherwise incapacitate a hostile intruder who has entered the cockpit. The anti-hijacking system includes one or more inflation devices, such as deployable air bags.

12 Claims, 9 Drawing Sheets

ANTI-HIJACKING SYSTEM

This is a continuation application of application Ser. No. 10/209,435 filed Jul. 30, 2002, now U.S. Pat. No. 6,688,555.

FIELD OF THE INVENTION

The subject matter of the present invention relates to an apparatus and method to forcefully disable, disarm, immobilize, or otherwise incapacitate a hostile intruder. More specifically, the subject matter of the present invention provides an anti-hijacking device that forcefully incapacitates a hostile intruder entering an aircraft cockpit.

BACKGROUND OF THE INVENTION

Presently, airplane personnel and pilots are somewhat defenseless against a would-be hijacker that has gained access to the cockpit of an airplane. For a multitude of reasons, it remains illegal for pilots to carry firearms as a possible deterrent to hostile intruders. Thus, once an intruder enters the cockpit, there are few options available to the endangered pilot. Consequentially, the passengers and crew are all placed in immediate danger.

Devices that attempt to slow entry into the cockpit or attempt to confine a hostile intruder, while somewhat effective, may simply delay the inevitable. If the intruder is heavily armed or equipped, there may be nothing available to alleviate the potential danger.

There exists, therefore, a need for an anti-hijacking system that can be used to forcefully incapacitate a hostile intruder to maintain the safety of the pilots, crew, and passengers on an airplane.

SUMMARY OF THE INVENTION

One embodiment of the present invention provides an anti-hijacking system used in an airplane or other restricted access area to provide forceful contact to disarm, disable, immobilize or otherwise incapacitate a hostile intruder who has entered the restricted area. The anti-hijacking system includes one or more inflation devices.

DETAILED DESCRIPTION OF PREFERRED EMBODIMENTS

The anti-hijacking system of the present invention utilizes an inflation device to forcefully disable or otherwise incapacitate a hostile intruder. Although the present invention is described primarily with reference to a hostile intruder entering into the cockpit of an airplane, it should be understood that the present invention has equal applicability in any number of physical locations where it is necessary to forcefully incapacitate a hostile individual.

Figure 1A:
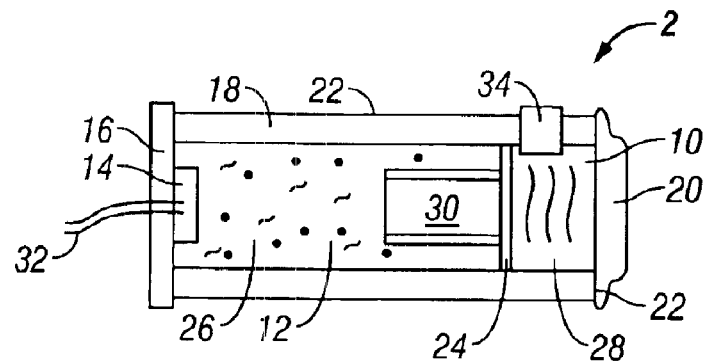
FIGS. 1A and 1B provide a cross-sectional elevational view of a prior art inflation device.
Figure 1B:
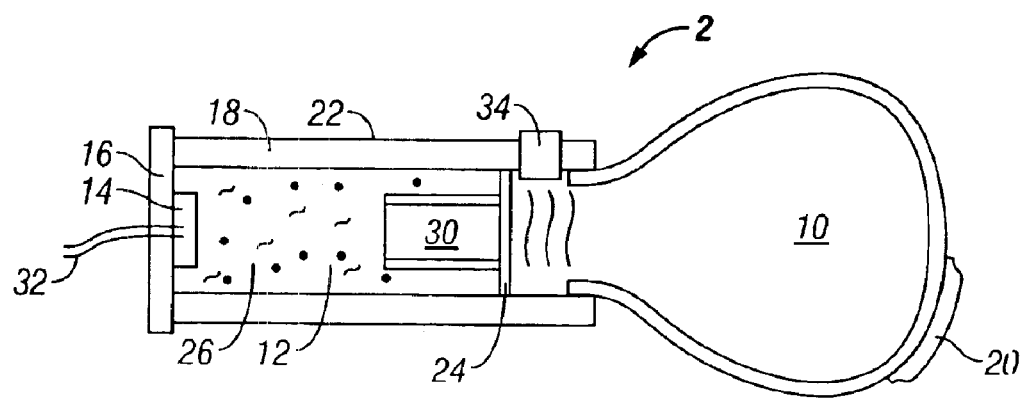

FIGS. 1A and 1B illustrate a typical inflation device 2 used as an automobile air-bag safety device or a confinement system as discussed in U.S. Pat. No. 5,792,976 to Genovese issued Aug. 11, 1998. The typical inflation device 2 has a device housing 5 that contains an air bag 10, a propellant 12, and a propellant primer 14. FIG. 1A illustrates the inflation device 2 with the air bag 10 in its uninflated, folded state. FIG. 1B illustrates the inflation device 2 with the air bag 10 in its inflated, deployed state.

In the exemplary inflation device 2, an end cap 16 is rigidly affixed to one end of the housing walls 18. A containment cap 20 is attached to the other end of the housing walls 18 by a frangible seal 22. A rigid partition 24, fixed to the inside surface of the housing walls 18, divides the device housing 5 into a propellant chamber 26 and a bag chamber 28. A gas flow tube 30 is secured within an opening in the rigid partition 24 to enable inflation gas generated in the propellant chamber 26 to enter the bag chamber 28.

The propellant 12 and propellant primer 14 are located in the propellant chamber 26. The primer 14 is mounted on the inside surface of the end cap 16 and includes lead wires 32 that extend from the primer 14 to the exterior of the device housing 5 through a sealed passage in the end cap 16.

In its uninflated state, as shown in FIG. 1A, the air bag 10 is completely contained within the bag chamber 28. The air bag 10 is formed from a flexible, impervious material having a single opening that is firmly fixed and sealed to the inside surface of the bag chamber 28. In the prior art inflation device 2 shown in FIGS. 1A and 1B, the containment cap 20 is preferably cemented to the outside surface of the air bag 10 to prevent the containment cap 20 from becoming a dangerous projectile during deployment.

A pressure-relief valve 34 is mounted on the device housing 5 such that it acts as a vent for the bag chamber 28. Adjustment of the operational pressure of the relief valve 34 regulates the inflation rate of the air bag 10.

To activate the inflation device 2 to deploy the air bag 10, an initiation signal is first applied to the lead wires 32 to energize the propellant primer 14. Upon the energizing of the propellant primer 14, the propellant 12 burns to produce an inflation gas that flows through the flow tube 30 into the bag chamber 28. The resulting pressure increase in the bag chamber 28 acts to fracture the frangible seal 22 and propel the containment cap 20 away from the device housing 5. Because the cap 20 is cemented to the exterior of the air bag 10, propelling of the containment cap 20 acts to help release the bag 10 from the bag chamber 28 while the inflation gases continue to fill the interior of the bag 10. Once the bag 10 is completely inflated, the relief valve 34 opens to permit vent gases to escape. The relief valve 34 remains open until all of the propellant is consumed.

It should be noted that the above-described activation of a conventional inflation device takes place at an extremely rapid rate. Conventional automobile air bags usually inflate within milliseconds. Such rapid inflation results in extremely high force generation. As discussed in detail below, such high force generation is used to advantage in the present invention.

Figure 2A:
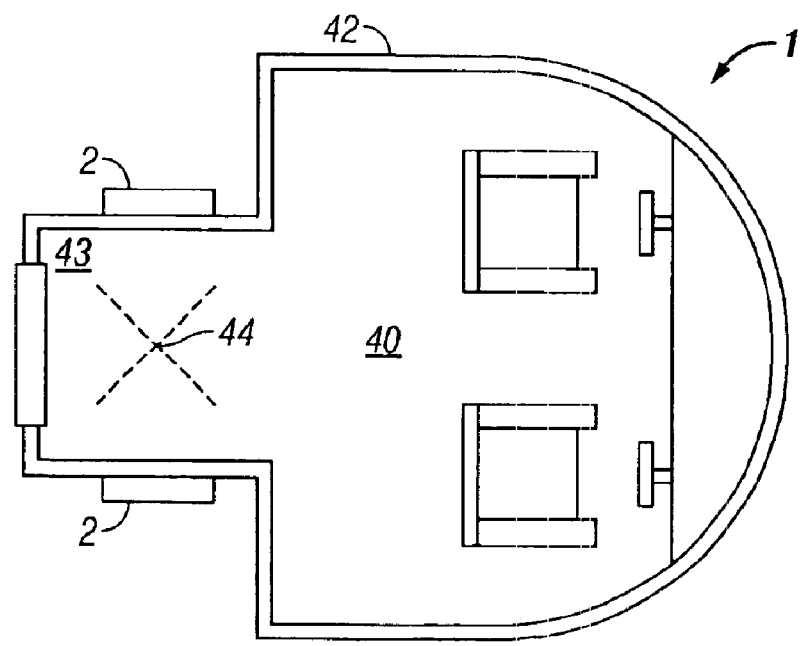
FIGS. 2A and 2B illustrate an embodiment of the anti-hijacking system having one or more inflation devices located in the side walls of the cockpit.
Figure 2B:
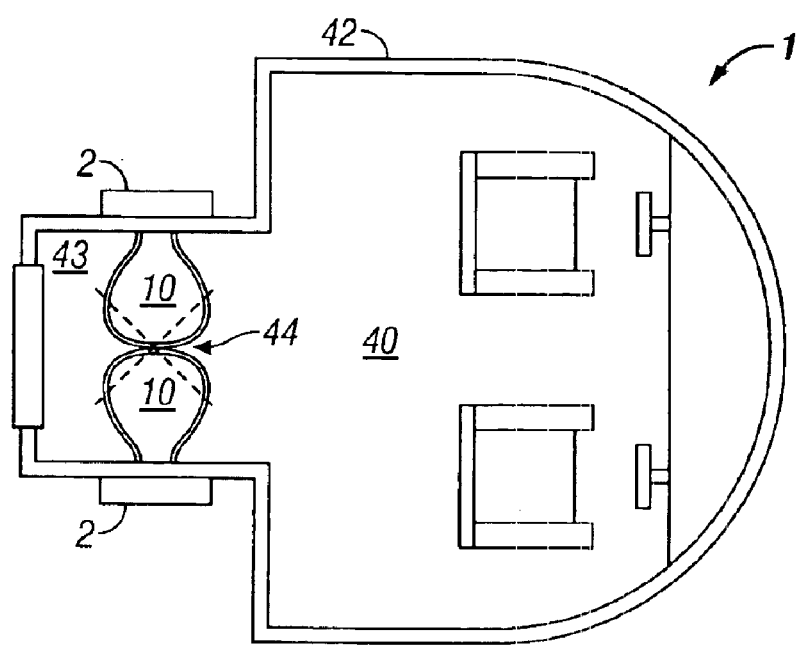

An embodiment of the anti-hijacking system, indicated generally as numeral 1, of the present invention is illustrated in FIGS. 2A and 2B. In this embodiment, the anti-hijacking system 1 is used to counteract a hostile intruder that has entered into the cockpit 40 of an airplane. In FIG. 2A, the inflation devices 2 of the anti-hijacking system 1 are shown with their air bags 10 in their uninflated, undeployed state. In FIG. 2B, the inflation devices 2 are shown with their air bags 10 in their inflated, deployed state.

In the embodiment shown in FIGS. 2A and 2B, one or more inflation devices 2 are located in the walls 42 of the cockpit 40. The one or more inflation devices 2 are located such that upon activation of the system 1, the fully deployed and inflated air bags 10 come into forceful contact with any item or individual located within the strike zone 44. Thus, if the anti-hijacking system 1 is activated while a hostile intruder is standing within the strike zone 44, the deployed air bags 10 will strike the intruder to forcefully disable, disarm, immobilize or otherwise incapacitate the hostile intruder. The forceful deployment acts to impart injury, potentially serious, to the hostile intruder without any potential of injuring the remaining passengers. Further, the anti-hijacking system 1 is not a weapon that can be used by the hostile intruder against the remaining passengers or crew.

As shown in FIGS. 2A and 2B, the one or more inflation devices 2 are located in the walls 42 of the passageway 43 to the cockpit 40. However, it should be recognized that the one or more inflation devices 2 can be located in the walls 42, floor or ceiling of the cockpit 40, or at any other strategic location that would enable a forceful strike on a hostile intruder that has entered a protected zone.

Figure 3:
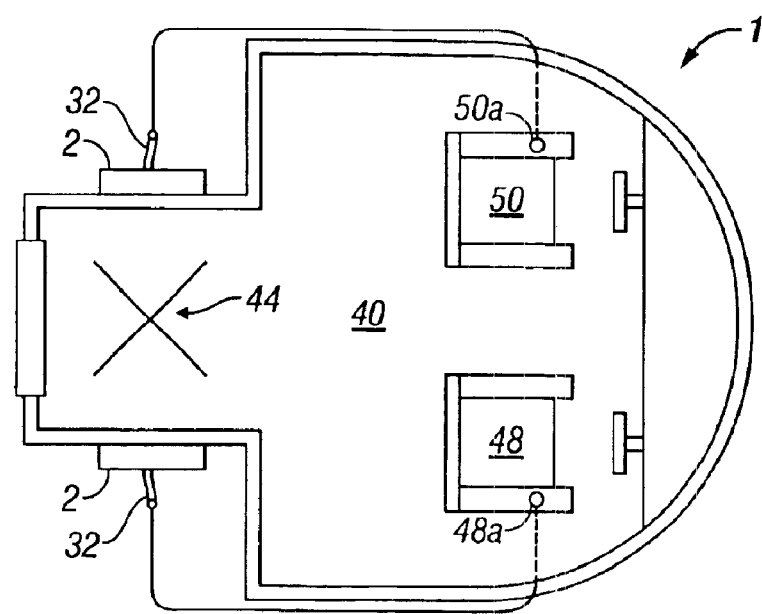
FIG. 3 illustrates a wired trigger embodiment of the signal generator of the anti-hijacking system.

As discussed above, activation of the one or more inflation devices 2 is achieved by sending an initiation signal to the lead wires 32 which in turn energizes the propellant primer 14. It should be understood that the initiation signal can be sent by any known means accessible by the pilots or other aircraft personnel. In one embodiment, shown in FIG. 3, the initiation signal is provided by triggers 46, 47 that are in wired communication with the lead wires 32. The triggers 46, 47 may be any conventional mechanism capable of energizing the primer 14. In the embodiment shown, one trigger 46 is located in the arm 48a of the pilot's chair 48, while the other trigger 47 is located in the arm 50a of the co-pilot's chair 50. It should be understood that the triggers 46, 47 can be located anywhere within the cockpit 40 that enables access by the aircraft crew.

Figure 4:
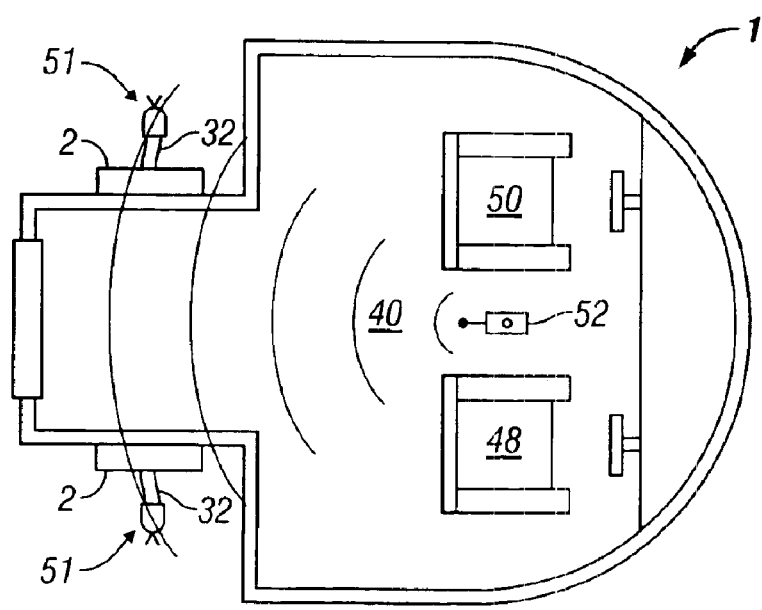
FIG. 4 illustrates a remotely actuated embodiment of the signal generator of the anti-hijacking system.

In alternate embodiments, the initiation signal can be provided remotely by conventional remote-controlled energizers responsive to radio signals. For example, as illustrated in FIG. 4, a radio receiver 51 can be connected to the lead wires 32 such that upon receipt of a proper radio signal from a remote actuator 52, the radio receiver 51 applies a trigger signal to the wires 32 to energize the primer 14. In such embodiments, the pilots can maintain a remote actuator 52 on their body to facilitate urgent activation. Alternatively, or in conjunction with, remote actuator's 52 can be maintained by personnel outside the cockpit 40, or even outside the plane to facilitate activation in instances where the pilots are unable to send the trigger signal, for example.

Figure 5:
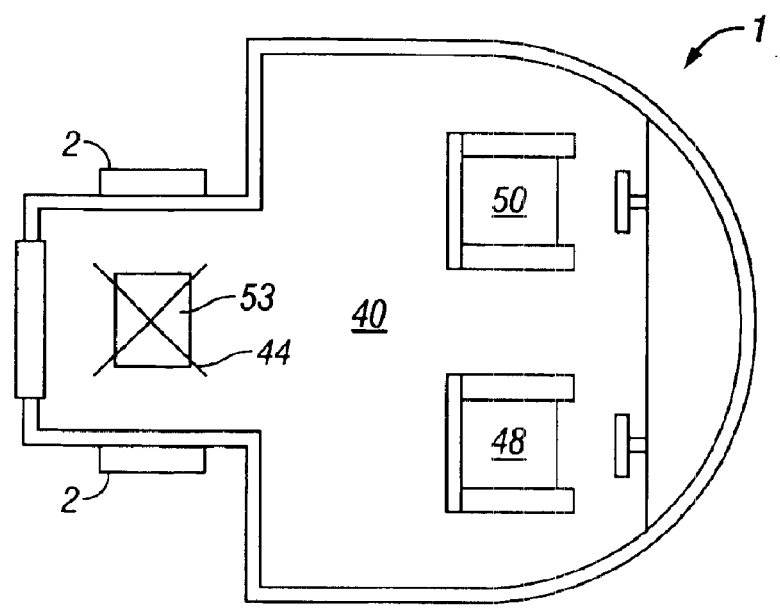
FIG. 5 illustrates a sensor-controlled embodiment of the signal generator of the anti-hijacking system.

In further alternate embodiments, the initiation signal can be provided automatically by use of conventional sensor-controlled energizers. One example of an embodiment employing a sensor-controlled energizer is shown in FIG. 5. In this embodiment, a pressure plate 53 is located within the strike zone 44. In use, the pressure plate 53 is activated to sense pressure during times when no one should be located within the strike zone 44. Entry into the strike zone 44 by an intruder results in a pressure that is applied to and detected by the pressure plate 53. Upon detection, an initiation signal is sent by the pressure plate 53 to the lead wires 32 and the air bags 10 are deployed to provide force to disable, disarm or otherwise incapacitate the intruder.

Examples of other conventional sensor-controlled energizers with applicability in the present invention are those that detect motion. For example, infrared sensors, Doppler radar sensors, proximity detectors, ultrasound sensors, eddy current sensors, laser detectors, and the like can be used to patrol the strike zone 44.

Figure 6A:
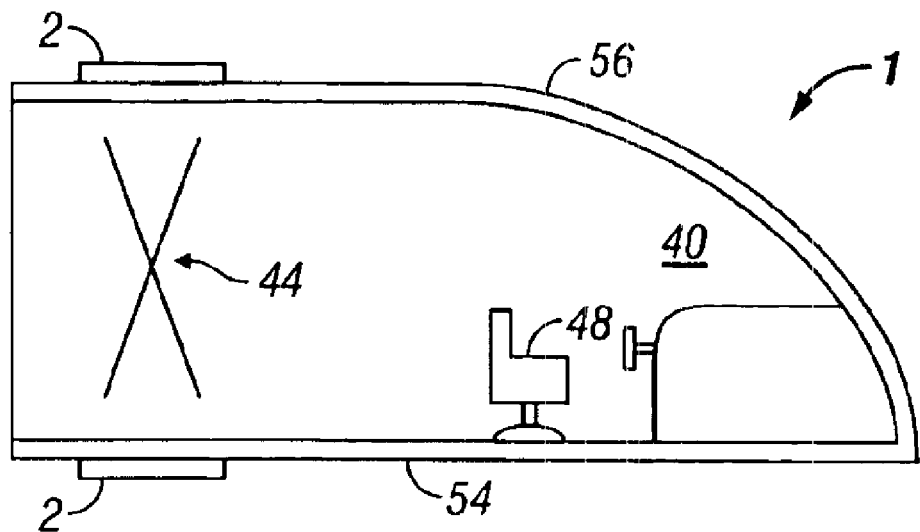
FIGS. 6A and 6B illustrate an embodiment of the anti-hijacking system having one or more inflation devices located in the ceiling and floor of the cockpit.
Figure 6B:
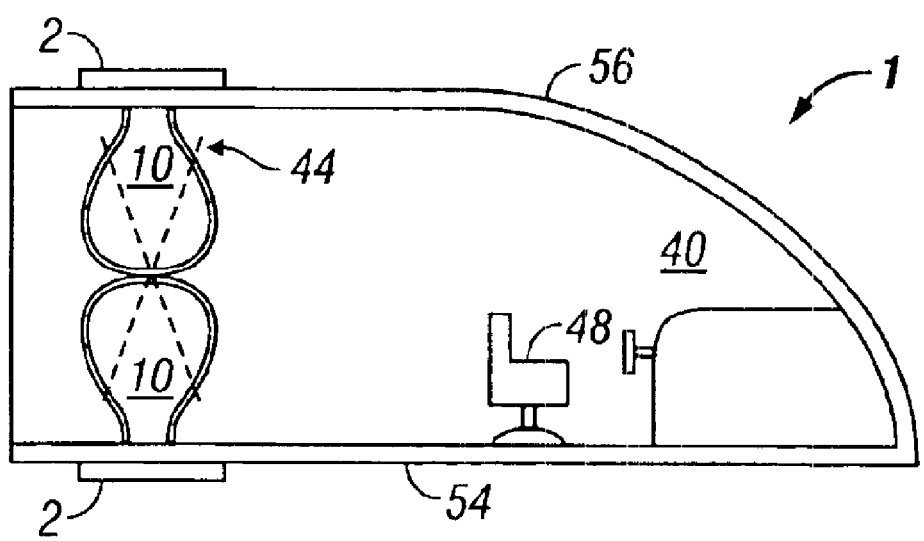

FIGS. 6A and 6B illustrate another embodiment of the anti-hijacking system 1 in which the one or more inflation devices 2 are located in the cockpit floor 54 and the cockpit ceiling 56. In FIG. 6A, the one or more inflation devices 2 are shown before deployment, while in FIG. 6B, the one or more inflation devices 2 are shown after deployment.

As with the earlier discussed embodiments, the one or more inflation devices 2 are located such that upon activation of the system 1, the fully deployed and inflated air bags 10 come into forceful contact with any item or individual located within the strike zone 44. Again, such forceful contact acts to forcefully disable, disarm, immobilize or otherwise incapacitate a hostile intruder.

Figure 7A:
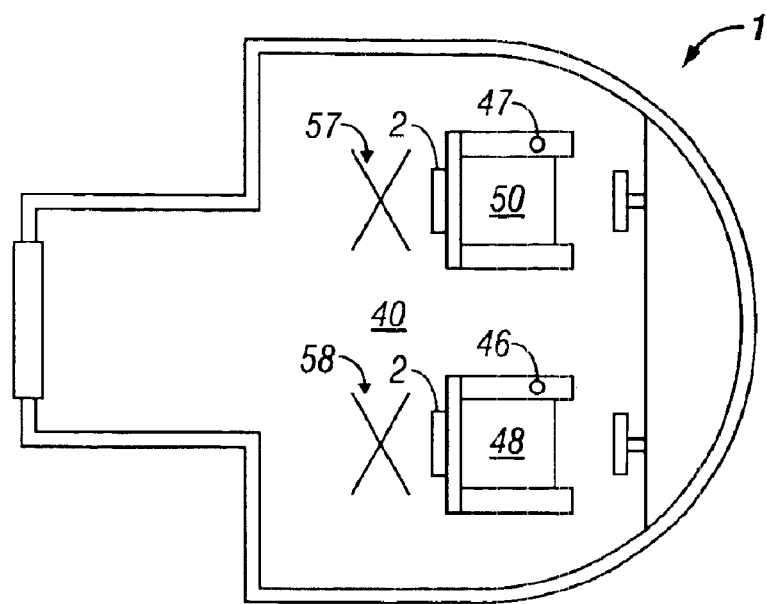
FIGS. 7A and 7B illustrate an embodiment of the anti-hijacking system having one or more inflation devices located in the pilot's and co-pilot's chairs.
Figure 7B:
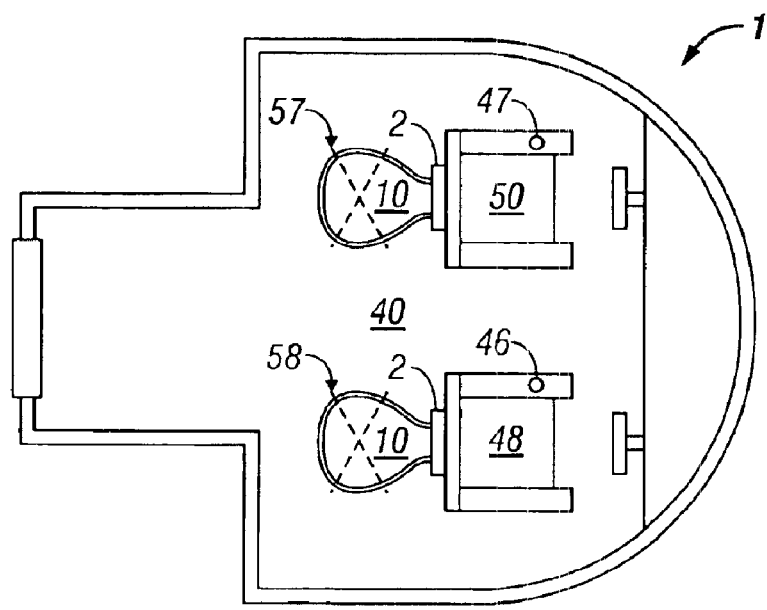

FIGS. 7A and 7B illustrate another embodiment of the anti-hijacking system 1 in which the one or more inflation devices 2 are located in the back of the pilot's chair 48 and the co-pilot's chair 50. In FIG. 7A, the one or more inflation devices 2 are shown before deployment, while in FIG. 7B, the one or more inflation devices 2 are shown after deployment. Upon activation of the system 1, the fully deployed and inflated air bags 10 come into forceful contact with any item or individual located within the strike zones 57, 58 to forcefully disable, disarm, immobilize or otherwise incapacitate a hostile intruder. It should be understood that separate signal generators 46, 47 can be used to control activation of the inflation devices 2 located in the different chairs 48, 50.

Figure 8:
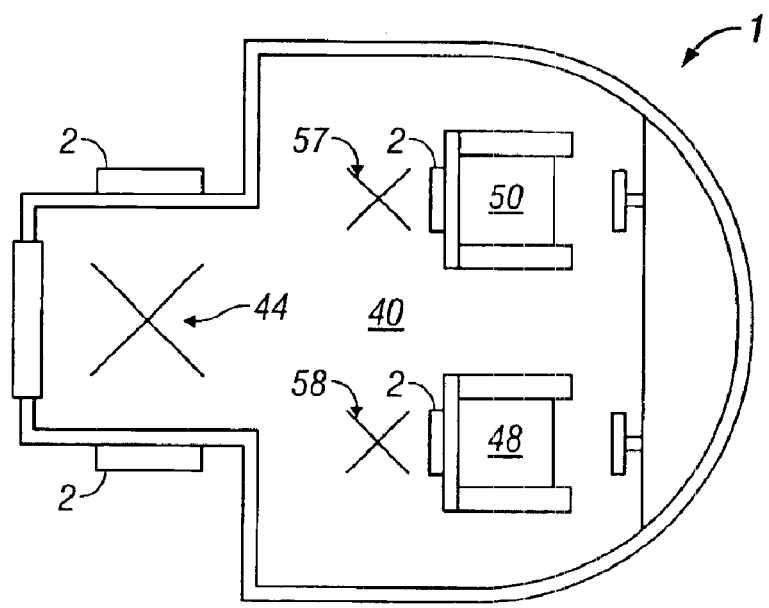
FIG. 8 illustrates an embodiment of the anti-hijacking system having one or more inflation devices located in the cockpit walls and the pilot's and co-pilot's chairs.

It should be noted that any number of combinations of inflation device 2 locations remain within the scope of the anti-hijacking system 1 of the present invention. For example, in the embodiment of the anti-hijacking system 1 illustrated in FIG. 8, the one or more inflation devices 2 are located in the cockpit walls 42 as well as in the back of the pilot's chair 48 and the back of the co-pilot's chair 50. The one or more inflation devices 2 located in the walls 42 protect the strike zone 44 and are activated by a first initiation signal. Similarly, the one or more inflation devices 2 located in the chairs 48, 50 protect the associated strike zones 57, 58 and are activated by separate initiation signals. In this manner, the system 1 provides both an internal back-up system and provides the ability to incapacitate a plurality of intruders into the cockpit 40.

Figure 9A:
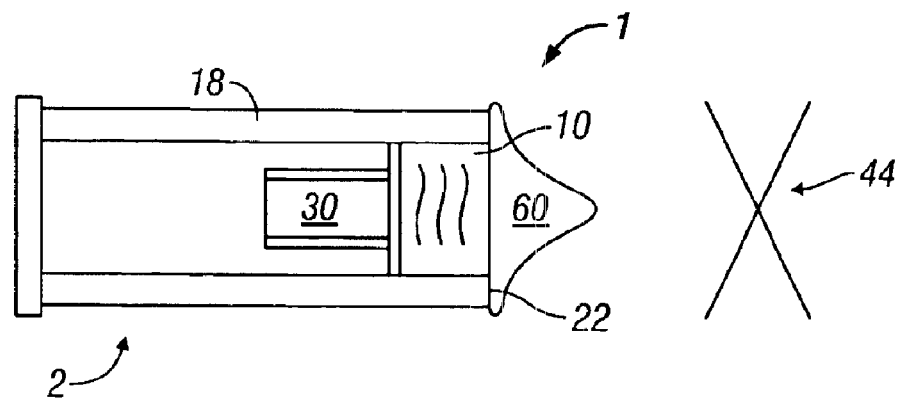
FIGS. 9A and 9B illustrate an alternate embodiment of the one or more inflation devices utilized by the anti-hijacking system.
Figure 9B:
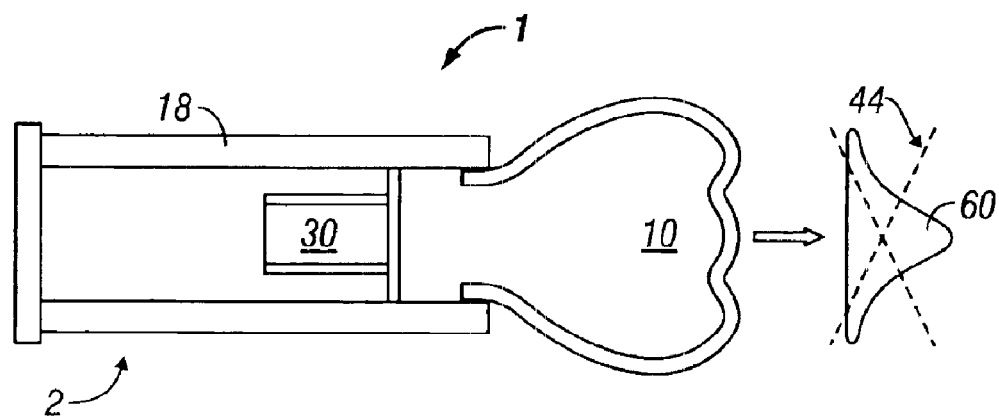

FIGS. 9A and 9B illustrate an alternate embodiment of the one or more inflation devices 2 utilized by the anti-hijacking system 1. In this embodiment, the containment cap 20 is replaced by a projectile cap 60. The projectile cap 60 is again attached to the housing walls 18 by a frangible seal 22.

However, the projectile cap 60 is not cemented or otherwise affixed to the outside surface of the air bag 10. Thus, upon activation of the system 1, as shown in FIG. 9B, the cap 60 becomes a high-speed projectile directed toward the strike zone 44. Depending upon the amount of force and type of impact desired, the projectile cap 60 can be formed of any number of materials and can take on any number of geometries. For example, in one embodiment, the projectile cap 60 is a tethered projectile. The use of the tethered projectile limits the injury potential to innocent bystanders.

Furthermore, in alternate embodiments, the projectile cap 60 can be pre-fragmented to break into multiple projectiles upon activation of the system 1. Similarly, the containment cap 20 can be replaced by a plurality of projectile caps 60.

As discussed above, although the anti-hijacking system 1 of the present invention has been described in conjunction with an airplane cockpit 40, it should be understood that the system 1 has equal application in any number of locations within the plane. For example, the anti-hijacking system 1 can be used to protect the passageway located immediately outside the cockpit door, staff work areas, aircraft exits, restrooms, and the like. Furthermore, the system 1 has equal application in any number of non-aircraft related restricted access environments. One such example is provided in FIGS. 10A and 10B.

Figure 10A:
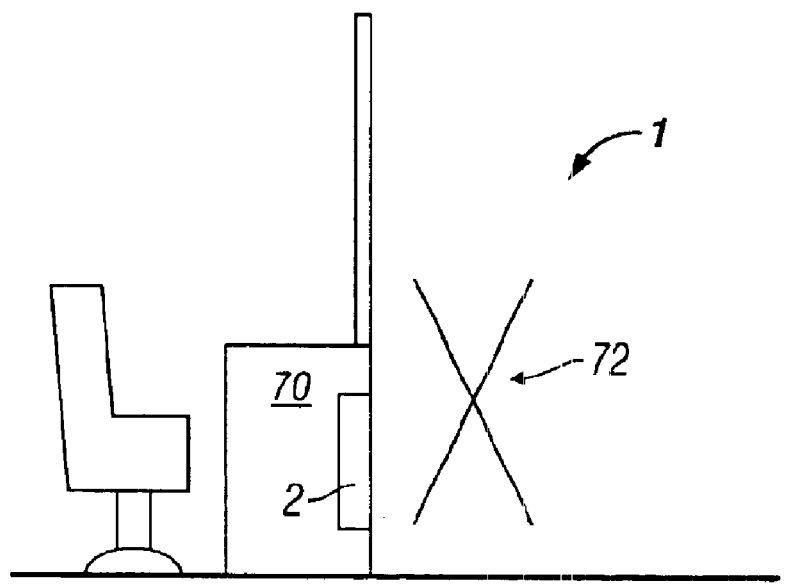
FIGS. 10A and 10B illustrate an embodiment of the anti-hijacking system used at a bank.
Figure 10B:
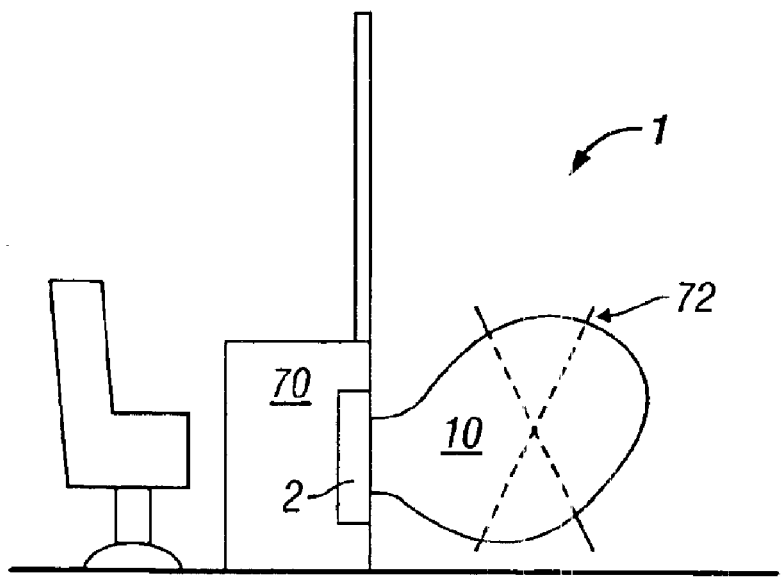

In FIGS. 10A and 10B, the anti-hijacking system 1 is shown having one or more inflation devices 2 located in front of a bank teller booth 70. If a hostile individual is located in the strike zone 72 (e.g., during a holdup), the teller can send an initiation signal to deploy the airbag 10 to forcefully disarm, disable, immobilize or otherwise incapacitate the hostile individual. Similarly, the anti-hijacking system 1 of the present invention can be used to advantage in convenience stores, gas stations, or other fixed locations subject to unwarranted intrusion.

It should be noted that any number of types of inflation devices 2 can be used to advantage in the present invention. For example, in applications where pyrotechnic inflation is not desirable or feasible, pressurized gas feed systems using compressed gas can be employed to deploy the contained air bag 10. Further, the air bag 10 can be made of various materials such as polymers, natural rubber, woven fabrics, etc. Still further, the air bags 10 can take on a variety of shapes and sizes depending upon the space requirements and intended strike area.

Figure 11A:
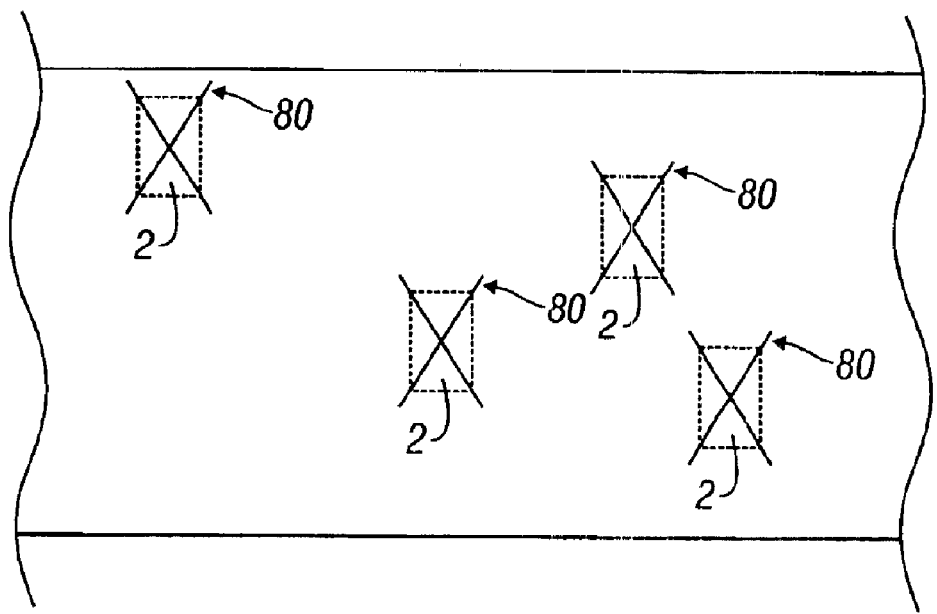
FIGS. 11A and 11B illustrate an embodiment of the anti-hijacking system used as an "air bag land mine."
Figure 11B:
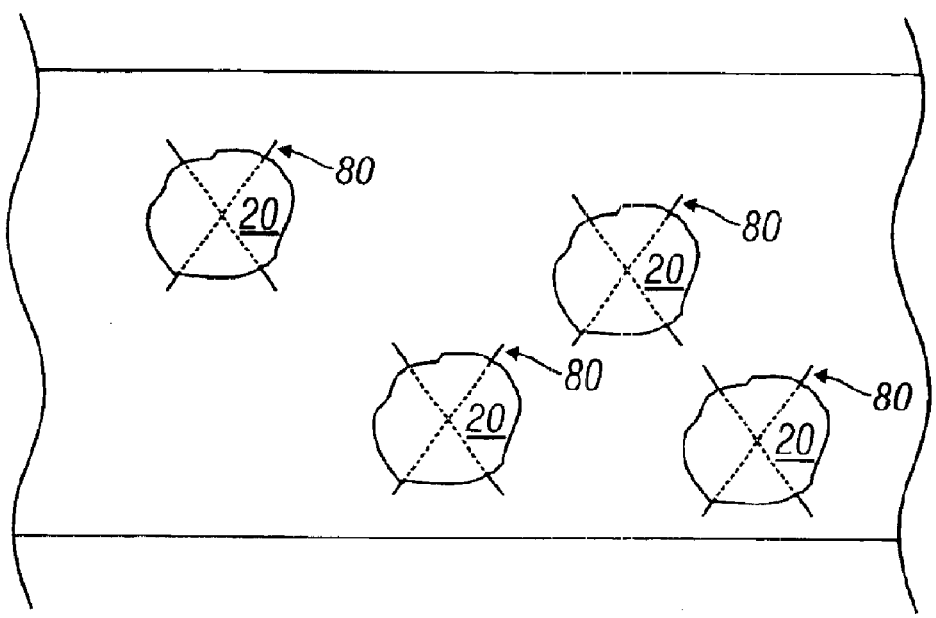

Another embodiment of the anti-hijacking system 1 of the present invention is illustrated in FIGS. 11A and 11B. In this embodiment, the anti-hijacking system provides an "air bag land mine." In this embodiment, one or more inflation devices 2 are located at various floor (or ground) locations and are activated by sensor-controlled energizers such as pressure plates or motion detectors, or can be activated by remote-controlled energizers. In FIG. 11A, the one or more inflation devices 2 are shown before deployment, while in FIG. 11B, the one or more inflation devices 2 are shown after deployment.

As discussed with earlier embodiments, upon deployment, the inflated air bags 10 come into forceful contact with any item or individual located within the various strike zones 80. Again, such forceful contact acts to forcefully disable, disarm, immobilize or otherwise incapacitate a hostile intruder. However, unlike conventional land mines using explosives, the injurious force can be concentrated and better controlled, enabling forceful strikes that are less likely to critically wound an intruder.

The invention being thus described, it will be obvious that the same may be varied in many ways. Such variations are not to be regarded as a departure from the spirit and scope of the invention, and all such are intended to be included within the scope of the following non-limiting claims.

What is claimed is:

1. An anti-hijacking system for use in an airplane, the anti-hijacking system comprising:

one or more inflation devices adapted to rapidly inflate within milliseconds to provide forceful contact upon receipt of an initiation signal;

an activation device adapted to provide an initiation signal to activate the one or more inflation devices; and wherein the one or more inflation devices are located outside of the airplane cockpit.

2. The anti-hijacking system of claim 1, wherein the one or more inflation devices are located in the walls of the passageway outside of the airplane cockpit.

3. The anti-hijacking system of claim 1, wherein the one or more inflation devices are located in the floor of the passageway outside of the airplane cockpit.

4. The anti-hijacking system of claim 1, wherein the one or more inflation devices are located in the ceiling of the passageway outside of the airplane cockpit.

5. The anti-hijacking system of claim 1, wherein the one or more inflation devices are located in the airplane staff work areas.

6. The anti-hijacking system of claim 1, wherein the one or more inflation devices are located proximate the aircraft exits.

7. The anti-hijacking system of claim 1, wherein the one or more inflation devices are located proximate the aircraft restrooms.

8. A method of preventing intrusion into an airplane cockpit, comprising:

providing one or more inflation devices adapted to rapidly inflate within milliseconds to provide forceful contact upon receipt of an initiation signal;

providing an activation device adapted to provide an initiation signal to activate the one or more inflation devices; and positioning the one or more inflation devices outside of the airplane cockpit.

9. The method of claim 8, wherein the one or more inflation devices are positioned in the passageway outside of the cockpit.

10. The method of claim 8, wherein the one or more inflation devices are positioned proximate the airplane staff work areas.

11. The method of claim 8, wherein the one or more inflation devices are positioned proximate the airplane restrooms.

12. The method of claim 8, wherein the one or more inflation devices are positioned proximate the airplane exits.

* * * * *